P. L. E. DEL FUNGO-GIERA.
SUBMARINE SUPPLY TENDER.
APPLICATION FILED JULY 21, 1916.

1,228,756.

Patented June 5, 1917.

INVENTOR
ATTORNEYS

UNITED STATES PATENT OFFICE.

PHILIPPO L. E. DEL FUNGO-GIERA, OF NEW YORK, N. Y.

SUBMARINE SUPPLY-TENDER.

1,228,756.  Specification of Letters Patent.  Patented June 5, 1917.

Application filed July 21, 1916. Serial No. 110,584.

*To all whom it may concern:*

Be it known that I, PHILIPPO L. E. DEL FUNGO-GIERA, a citizen of the Republic of Switzerland, and a resident of New York city, New York, have invented a new and useful Improvement in Submarine Supply-Tenders, which invention is fully set forth in the following specification.

This invention relates to submarine supply tenders, and has for its object to provide a submarine structure in the nature of a magazine of sufficient size to contain the necessary supplies of oxygen-air, fuel and lubricating oil, storage batteries, repair parts, tools, ammunition, torpedoes, and provisions for supplying or re-equipping a submarine. This tender is designed to be submerged and securely anchored in position, and provided with a marking buoy whose character is suitably concealed by being covered with seaweed or other marine growth. For the purpose of effecting the submergence of the supply tender, it is connected, by cables working through suitable water-tight stuffing boxes, with an anchor or preferably a plurality of anchors located on the bottom, which cables are wound on or unwound from suitable drums operated by electrical motors within the tender. Preferably, four anchors are employed, each connected by a suitable cable to one of the four independent drums located in the four corners of the tender, and each drum is operated by an electrical motor, preferably a compound-wound motor. These motors are connected by suitable electrical connections with the marking buoy, such connections preferably passing through an armored cable connecting said buoy with the main body of the tender. The marking buoy is provided with a water-tight cover which can be removed by the crew of the submarine, and electrical connections are provided whereby the source of electrical energy on the submarine may be connected to and operate the motors in the tender, to the end that the same may be raised or lowered, as the case may require.

Preferably, the tender is divided into suitable water-tight compartments, each provided with suitable valves and man-holes for effecting entrance to the respective compartments, and also preferably one or more of these compartments is provided with a telescopic periscope whereby, for limited times and in case of emergency, operators may remain within the tender when the same is submerged, and at the same time obtain a view through the periscope of the surrounding waters.

Other features of the invention will be hereinafter more specifically described.

The inventive idea is capable of receiving a variety of mechanical expressions, one of which, for the purpose of illustrating the invention, is shown in the accompanying drawings. But it is to be understood that such drawings are for the purpose of describing the invention and not for defining the limits thereof, reference being had to the appended claims for this purpose.

In said drawings—

Figure 1:
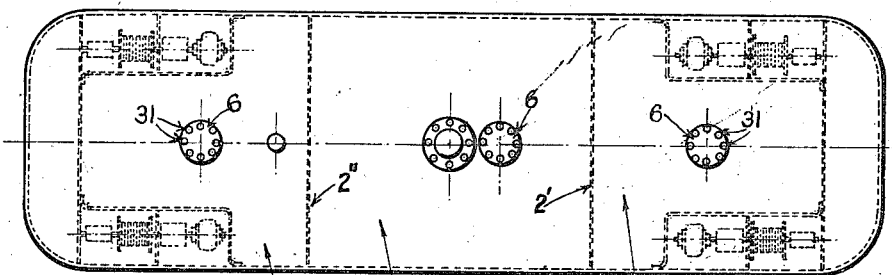
Figure 1 is a top plan view of the submarine tender with the motors, winding drums, and connected parts shown in dotted lines.
Figure 2:
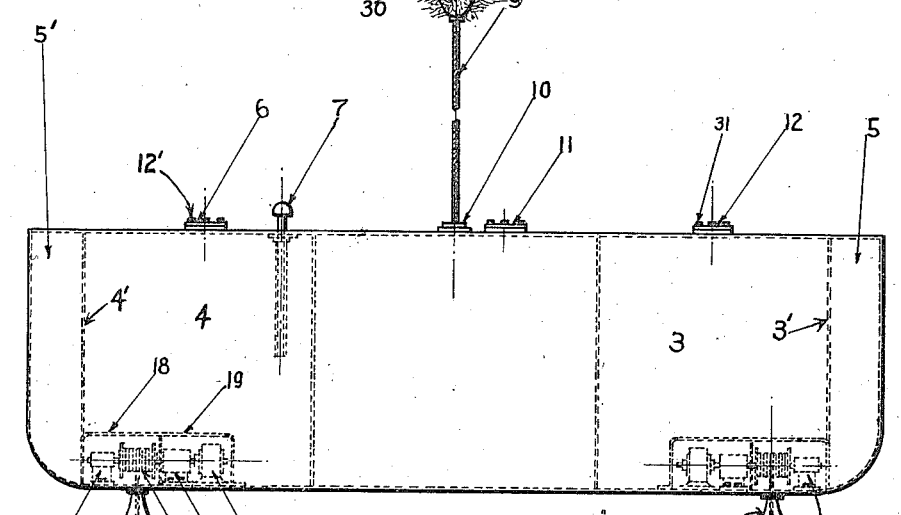
Fig. 2 is a side elevation showing the tender, marking buoy and its connecting cable, and the anchors with the cables connecting the same with the winding drums within the tender.

Referring to the drawings, in which like reference numerals indicate like parts throughout the several views, 1 indicates the hull of the tender which is preferably constructed of steel plates of sufficient thickness, sherardized, and solidly riveted together. 2, 3 and 4 indicate water-tight compartments separated from each other by suitable water-tight partitions 2', 2'', which compartments are designed for the storage and efficient separation, as desired, of ammunition, torpedoes, tools, etc., food and water, and fuel and lubricating oil and other desired or necessary supplies. For the purpose of providing storage capacity for air and oxygen, chambers 5, 5' are provided in the ends of the tender, the chamber 5' being separated from the chamber 3 by the air and water-tight partition 3', and the chamber 5 being separated from the chamber 5' by the air and water-tight partition 4'. 6, 6, 6 are suitable man-holes for affording entrance to the respective compartments 2, 3 and 4, which man-holes are closed by covers 11, 12 and 12' securely bolted in place by anti-galvanic brass bolts 31, suitable packing (not shown) being employed to make each closure water-tight. 7 is a telescopic periscope of suitable construction which may be located in any one of the compartments, here shown as being in the compartment 4. If desired, similar telescopic periscopes may be located in each of the compartments 2, 3 and 4. 8 is a marking buoy connected by an armored cable 9 within which are the electrical connections extending from the marking buoy 8 to the motors in the tender. These electrical connections may be of any desired or suitable character for supplying current from the submarine to the electrical motors and other electrical apparatus within the tender, and as their particular or specific construction forms no part of the present invention, it has not been deemed necessary to show the same. The electrical cable outlet 10 from the tender is preferably centrally located, and the electrical connections extend from this outlet to the various motors and other electrical apparatus.

The tender is provided with a plurality of anchoring cable inlets 14. In the present instance there are four of these inlets, one for each of the four cables 20, which cables are each connected by swivel-joints 21 to a massive weight 22 supported on a mushroom anchor 29 preferably made of heavy steel plate. The cables 20 are wound upon drums 15 connected by direction-clutches 16 with compound wound electrical motors 17, the connection being preferably effected through reduction gearing of any suitable character (not shown). If desired, indicating or recording devices 13 may be connected to the cable drums 15 for the purpose of indicating the amount of cable that is wound or unwound from the drum, and therefore indicating the extent of submergence of the structure as a whole. The drum 15 and the indicating or recording device 13 are inclosed in a water-tight compartment 18, and the direction-clutch 16 and motor 17 are inclosed in a similar water-tight compartment 19.

Figure 3:
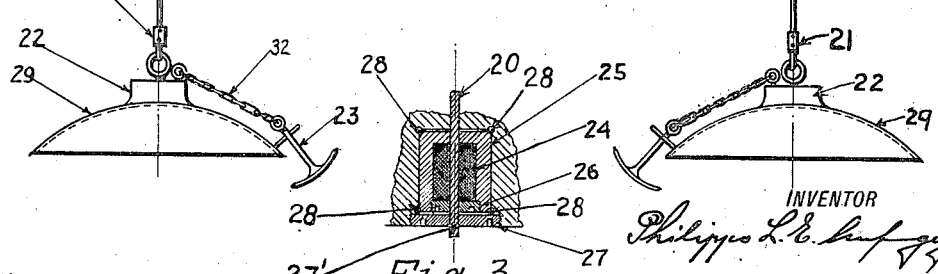
Fig. 3 is a sectional detail showing the preferred construction of water-tight packing employed at the points where the cables connecting the anchors to the tender enter the latter.

Preferably, the flexible steel cables 20 are provided with water-tight stuffing boxes, shown in section in Fig. 3, in which 24 indicates suitable packing material inclosed in a revolving stuffing box 25, which box is closed at its bottom with a suitable closure plate 26 preferably screw-threaded therein. This stuffing box 25 is in turn inclosed in its casing by means of plate 27, which plate is provided with a cable inlet 27', registering with a corresponding inlet in the plate 26. The stuffing box 25 as a whole is provided with suitable ball-bearings 28 to the end that it may freely revolve in its housing with as little friction as possible. Connected to any suitable part of one or more of the mushroom anchors 29 or the weights 22 (here shown as connected to the latter) are standard or other suitable marine anchors, suitable anchor chains 32 being employed for this purpose.

30 indicates seaweed or other marine growth with which the marking buoy 8 may be covered for concealing its identity.

It will be understood that the direction-clutches 16 may be of any suitable construction of electric direction-clutch, by means of which the direction of rotation of the motor and, therefore, the cable drums may be controlled to the end that the tender may be raised or lowered, as desired.

Inasmuch as the specific construction of the electrical motors, direction-clutches, electrical connections and indicating or recording devices do not form any part of the present invention, the same are claimed only as a part of the combination of elements as a whole, and it has not been deemed necessary to specifically illustrate the particular construction of said elements. It will be understood that any desired or standard constructions may be employed in the several localities and for the several uses indicated.

If desired, suitable valves may be and preferably are provided on the top of the tender for the pump connections to the several oil tanks, in addition to the several man-holes indicated. These valves may be of any usual or suitable construction and will, of course, be provided with proper pipe connections leading therefrom to the respective tanks.

The operation of the invention will be readily understood. The marking buoy floats upon the surface of the water, and through said marking buoy electrical connections may be made from the source of electrical energy upon the submarine with the several motors in the tender, and the latter may be operated, for example, to wind up the flexible cables 20 connecting the tender with the anchors and thereby submerging the tender. This winding action may be continued until the tender is submerged to the desired extent, after which the source of electrical energy upon the submarine is disconnected from the tender at the marking buoy 8, and the cover of the buoy securely bolted in position, and the character of the buoy is then concealed by placing seaweed or other marine growth thereon. When the submarine wishes to take supplies from the tender, it approaches the marking buoy, removes the cover, makes the electrical connections and directs the current through the motors in the proper direction to unwind the cables 20, whereupon the natural buoyancy of the tender will cause it to rise to the surface. When it has reached the surface, the man-holes may be opened and entered by the crew of the submarine and, if desired, pumping connections may be effected with the oil and other supply tanks within the tender and their contents transferred to the submarine. It will be understood that the increased buoyancy necessarily arising from the discharge of supplies from the tender may be compensated by filling one or more of the compartments with water to a greater or less extent. In case it is found desirable for any one to remain for a short period of time aboard the tender while the latter is submerged, this may be safely accomplished providing the submergence does not continue until the supply of oxygen on board the tender is exhausted. In such case the telescopic periscope may be employed to give the attendant within the tender a view of the surrounding water.

Having thus described the invention and the manner in which the same is to be constructed and used, what is claimed is:

1. In a submarine supply tender, the combination of a hull or shell, anchoring means therefor, a motor within said hull, operative connections between said motor and said anchoring means for raising and lowering said hull, and connections for controlling said motor accessible from the surface of the water.

2. In a submarine supply tender, the combination of a hull or shell, an anchor therefor, a motor within said hull, a winding drum operatively connected to said motor, a cable connected to said anchor and designed to be wound on and unwound from said drum, and connections for controlling said motor accessible from the surface of the water.

3. In a submarine supply tender, the combination of a hull or shell, anchoring means therefor, an electric motor within said hull, operative connections between said motor and said anchoring means for raising and lowering said hull, a marking buoy, and electrical connections between said buoy and said motor.

4. In a submarine supply tender, the combination of a hull or shell, a plurality of anchors therefor, a plurality of motors within said hull, operative connections between said motors and said anchors for raising and lowering said hull, and connections for controlling said motors accessible from the surface of the water.

5. In a submarine supply tender, the combination of a hull or shell, anchoring means therefor, an electric motor within said hull, operative connections between said motor and said anchoring means for raising and lowering said hull, means for controlling the direction of rotation of said motor, a marking buoy, and electrical connections between said motor and said buoy.

In testimony whereof I have signed this specification.

PHILIPPO L. E. del FUNGO-GIERA.